United States Patent [19]

Pike et al.

[11] Patent Number: 5,597,645
[45] Date of Patent: Jan. 28, 1997

[54] NONWOVEN FILTER MEDIA FOR GAS

[75] Inventors: Richard D. Pike, Norcross; Richard M. Peterson, Marietta, both of Ga.

[73] Assignee: Kimberly-Clark Corporation, Neenah, Wis.

[21] Appl. No.: 298,000

[22] Filed: Aug. 30, 1994

[51] Int. Cl.[6] .......................... B01D 39/16; B01D 46/00; B03C 3/28; B32B 33/00
[52] U.S. Cl. ........................ 96/99; 55/528; 55/DIG. 39; 210/748; 210/243; 210/510.1; 264/466; 428/362; 442/353; 442/359; 442/360; 442/401
[58] Field of Search ................... 55/DIG. 39, 528; 210/748, 243, 510.1; 204/186, 188; 264/22; 428/224, 288, 296, 362

[56] References Cited

U.S. PATENT DOCUMENTS

| | | |
|---|---|---|
| 1,094,420 | 1/1968 | DuPont DeNeMours . |
| 3,399,259 | 8/1968 | Brayford .................... 264/168 |
| 3,423,266 | 1/1969 | Davies et al. ............... 156/167 |
| 3,595,731 | 7/1971 | Davies et al. . |
| 3,692,618 | 9/1972 | Dorschner et al. ............ 161/72 |
| 3,780,149 | 12/1973 | Keuchel et al. .............. 264/168 |
| 3,802,817 | 4/1974 | Matsuki et al. ............... 425/66 |
| 3,849,241 | 11/1974 | Butin et al. . |
| 4,189,338 | 2/1980 | Ejima et al. ................. 156/167 |
| 4,211,661 | 7/1980 | Perry ......................... 210/491 |
| 4,215,682 | 8/1980 | Kubik et al. ................. 128/205 |
| 4,269,888 | 5/1981 | Ejima et al. ................. 428/296 |
| 4,280,860 | 7/1981 | Shen et al. .................. 156/167 |
| 4,340,563 | 7/1982 | Appel et al. ................. 264/518 |
| 4,375,718 | 3/1983 | Wadsworth et al. ............ 29/592 |
| 4,414,276 | 11/1983 | Kiriyama et al. ............. 428/374 |
| 4,469,540 | 9/1984 | Furukawa et al. ............. 156/624 |
| 4,508,113 | 4/1985 | Malaney ..................... 128/132 |
| 4,511,378 | 11/1985 | Carey, Jr. ................... 428/198 |
| 4,589,894 | 5/1986 | Gin et al. .................... 55/274 |
| 4,657,804 | 4/1987 | Mays et al. .................. 428/212 |
| 4,663,220 | 5/1987 | Wisneski et al. .............. 428/221 |
| 4,749,348 | 6/1988 | Klaase et al. .............. 425/174.8 E |
| 4,774,124 | 9/1988 | Shimalla et al. .............. 428/171 |
| 4,814,032 | 3/1989 | Taniguchi et al. ............. 156/167 |
| 4,818,587 | 4/1989 | Ejima et al. ................. 428/198 |
| 4,839,228 | 6/1989 | Jezic et al. .................. 428/401 |
| 4,842,739 | 6/1989 | Tang ......................... 210/489 |
| 4,874,666 | 10/1989 | Kubo et al. .................. 428/398 |
| 4,883,707 | 11/1989 | Newkirk ..................... 428/219 |
| 4,948,515 | 9/1990 | Okumura et al. .............. 210/748 |
| 4,981,749 | 1/1991 | Kubo et al. .................. 428/219 |
| 5,082,720 | 1/1992 | Hayes ........................ 428/224 |
| 5,106,552 | 4/1992 | Goi et al. .................... 264/103 |
| 5,108,820 | 4/1992 | Kaneko et al. ................ 428/198 |
| 5,130,196 | 7/1992 | Nishio et al. ................. 428/373 |
| 5,133,917 | 7/1992 | Jezic et al. ................. 264/210.8 |
| 5,167,765 | 12/1992 | Nielsen et al. ................ 162/146 |
| 5,198,057 | 3/1993 | Newkirk et al. ................ 156/83 |
| 5,225,014 | 7/1993 | Ogata et al. ................ 156/73.2 |
| 5,382,400 | 1/1995 | Pike et al. ................... 264/168 |
| 5,401,446 | 3/1995 | Tsai et al. .................... 264/22 |

FOREIGN PATENT DOCUMENTS

| | | |
|---|---|---|
| 0325854 | 8/1989 | European Pat. Off. ......... B03C 3/28 |
| 0466381A1 | 1/1992 | European Pat. Off. . |
| 0594123 | 4/1994 | European Pat. Off. ......... D04H 1/56 |
| 89/10989 | 11/1989 | WIPO . |
| 93/01334 | 1/1993 | WIPO . |

*Primary Examiner*—James C. Cannon
*Attorney, Agent, or Firm*—Michael U. Lee; William D. Herrick

[57] ABSTRACT

The present invention provides a filter medium, which contains an electretized nonwoven web of crimped fibers selected from the group consisting of spunbond filaments and staple fibers, wherein the nonwoven web has a Frazier permeability equal to or greater than about 100 ft$^3$/min/ft$^2$ and a density between about 0.01 g/cm$^3$ and about 0.095 g/cm$^3$.

26 Claims, 2 Drawing Sheets

NONWOVEN FILTER MEDIA FOR GAS

BACKGROUND OF THE INVENTION

The present invention is related to a filter medium for gaseous fluids, and more particularly related to a nonwoven web highly suitable for gaseous fluid filter media.

Different types of nonwoven webs have been used as filter media for various liquid and gas filtration applications, and such nonwoven webs include meltblown fiber webs, solution spun fiber webs, wet-laid fiber webs, carded fiber webs, air-laid fiber webs and spunbond fiber webs. Of these nonwoven fiber webs, microfiber nonwoven webs, such as meltblown fiber webs, have been widely employed as fine particle filter media since the densely packed fine fibers of these webs provide fine interfiber pore structures that are highly suitable for mechanically trapping or screening fine particles and therefore are conducive for providing a high filter efficiency. However, the fine pore structure of meltblown fiber webs and other similar webs having densely packed fine fibers results in a low permeability, creating a high pressure drop across the webs. Consequently, the low permeability of fine fiber filter media requires the application of a high driving pressure to establish an adequate throughput rate across the filter media. Furthermore, as contaminants accumulate on or in the surface of the filter media, the contaminants quickly clog the small interfiber pores, further reducing the permeability of the media, increasing the pressure drop across the media and rapidly shortening their service-life. In contrast, filter media with large interfiber pores and thus a high permeability, which contain sparsely packed and typically thick fibers, require a relatively low driving pressure to provide an adequate throughput rate and extended service-life. However, highly permeable filter media, e.g., fiberglass HVAC filters, suffer from a low filter efficiency in that the large interfiber pore structures of the media do not provide interstitial configurations that are suitable for entrapping fine contaminant particles.

In addition to the low permeability, microfiber webs typically do not have high physical strength. Thus, in general, microfiber filter media are laminated to at least one separate self-supporting layer, e.g., a spunbond fiber web, adding cost and complexity to the manufacturing process. For example, U.S. Pat. No. 4,589,894 to Gin et al. discloses a vacuum cleaner filter bag that is produced from a laminate of a fine fiber nonwoven layer and two highly porous nonwoven support layers.

Although filter media produced from nonwoven webs of coarser fibers, such as spunbond fiber webs and commonly-available staple fiber webs, have been used in filtration applications such as stove hood filters, they have not been used as filter media for fine particles. This is because, as mentioned above, the thickness of these coarse fibers causes the nonwoven webs to have larger interfiber pores than those of microfiber webs at a given basis weight, and consequently, nonwoven webs of spunbond fibers and staple fibers have not been used in fine particles filtration applications.

There is a need for self-supporting filter media that provide combinations of desirable filtration properties, including high filtration efficiency, high permeability, low pressure drop, high throughput, long service-life and self-supporting strength.

SUMMARY OF THE INVENTION

The present invention provides a nonwoven filter medium. The filter medium contains an electretized nonwoven web of crimped fibers selected from the group consisting of spunbond filaments and staple fibers, wherein the nonwoven web has a Frazier permeability equal to or greater than about 100 ft$^3$/min/ft$^2$ and a density between about 0.01 g/cm$^3$ and about 0.095 g/cm$^3$. Particularly desirable crimped fibers for the present invention are conjugate spunbond filaments and conjugate staple fibers, and more particularly desirable crimped fibers are conjugate spunbond filaments.

The present filter media provide a high filter efficiency that is comparable to the efficiencies of microfiber nonwoven web filters. In addition, the crimped-fiber filter media provide significantly extended service life, improved capacity, high physical integrity and low pressure drop across the media when compared to microfiber filter media.

The term "fibers" as used herein refers both to staple fibers and to filaments, which are continuous fibers, unless otherwise indicated. The term "spunbond fiber web" refers to a nonwoven fiber web of small diameter filaments that are formed by extruding a molten thermoplastic polymer as filaments from a plurality of capillaries of a spinneret. The extruded filaments are cooled while being drawn by an eductive or other well-known drawing mechanism. The drawn filaments are deposited or laid onto a forming surface in a random, isotropic manner to form a loosely entangled fiber web, and then the laid fiber web is subjected to a bonding process to impart physical integrity and dimensional stability. The production of spunbond webs is disclosed, for example, in U.S. Pat. Nos. 4,340,563 to Appel et al. and 3,692,618 to Dorschner et al. Typically, spunbond fibers have an average diameter in excess of 10 μm and up to about 55 μm or higher, although finer spunbond fibers can be produced. The term "staple fibers" refers to discontinuous fibers, which typically have an average diameter similar to or somewhat smaller than that of spunbond fibers. Staple fibers are produced with a conventional fiber spinning process and then cut to a staple length, from about 1 inch to about 8 inches. Such staple fibers are subsequently carded or air-laid and thermally bonded to form a nonwoven web. The term "meltblown fibers" indicates fibers formed by extruding a molten thermoplastic polymer through a plurality of fine, usually circular, die capillaries as molten threads or filaments into a high velocity gas stream which attenuate the filaments of molten thermoplastic polymer to reduce their diameter. In general, meltblown fibers are microfibers that have an average fiber diameter of up to about 10 μm. After the fibers are formed, they are carried by the high velocity gas stream and are deposited on a collecting surface to form a web of randomly dispersed and autogenously bonded meltblown fibers. Such a process is disclosed, for example, in U.S. Pat. No. 3,849,241 to Butin et al. The term "electretized" as used herein indicates the condition in which a nonwoven medium is electret treated to hold permanent electrostatic charges.

DETAILED DESCRIPTION OF THE INVENTION

There is provided high efficiency, high throughput filter media for gaseous fluids. The filter media are electretized nonwoven webs of crimped spunbond or staple fibers, more desirably, of crimped spunbond or staple conjugate fibers. The present crimped-fiber filter media provide a high filter efficiency that is comparable to the efficiencies of microfiber nonwoven web filters while providing a significantly extended service-life, improved capacity and high physical integrity. Moreover, the pressure drop across the present filter media is significantly lower than that of microfiber web filter media. It is believed that the present filter media's physical properties, including uniform thickness, high porosity, high loft, low density and uniform fiber coverage, in conjunction with the media's capacity for holding high and durable electrostatic charges make the filter media highly efficient without the high pressure drop of prior art microfiber filter media. In addition, the physical properties of the present filter media allow the media to exhibit a desired combination of high filtrate throughput rate, high capacity and extended service-life. Although it is not wished to be bound by any theory, it is believed that the low-density and porous structure of the filter media provides numerous but tortuous paths for contaminated fluids to travel through and thus provides highly suitable means to mechanically and electrostatically trap particulates or contaminants from the fluids, thereby providing a high efficiency without a high pressure drop across the media. The low-density, porous structure of the present filter media is attributable to the crimped nature of the fibers forming the filter media. Suitable crimped-fiber filter media of the present invention have a density between about 0.01 g/cm$^3$ and about 0.095 g/cm$^3$, desirably between about 0.015 g/cm$^3$ and about 0.09 g/cm$^3$, and more desirably between about 0.02 g/cm$^3$ and about 0.08 g/cm$^3$. In addition, suitable filter media have a Frazier permeability at least about 100 ft$^3$/minute/ft$^2$ (cfm/sf), desirably between about 100 cfm/sf and about 2500 cfm/sf, more desirably between about 150 cfm/sf and about 2000 cfm/sf, as measured in accordance with Federal Test Method 5450, Standard No. 191A. In accordance with the invention, the basis weight of suitable filter media may vary widely. However, particularly suitable filter media have a basis weight from about 0.25 to about 15 ounce per square yard (osy), more particularly from about 0.4 to about 13 osy, and most particularly from about 0.5 to about 10 osy.

Fibers suitable for the present filter media include spunbond filaments and staple fibers containing one or more suitable polymer components. More particularly suitable fibers are conjugate spunbond fibers and conjugate staple fibers, and conjugate fibers and filaments suitable for the filter media contain at least two component polymers that have different melting points and occupy distinct cross sections along substantially the entire length of the fibers. Suitable conjugate fibers and filaments have a side-by-side or sheath-core configuration, including eccentric configurations and concentric configurations. Of the sheath-core configurations, particularly suitable are eccentric configurations in that they are more amenable to crimp imparting processes, as further described below.

As a particularly desirable embodiment of the present invention, the filter media are produced from a nonwoven web of crimped spunbond conjugate filaments. As further discussed below, the crimp level and, thus, the interfiber pore structure of spunbond conjugate filament nonwoven webs can be conveniently controlled during the spunbonding process, providing a flexible on-line process to conveniently produce customized or particularized filter media for various filter application needs. In addition, spunbond nonwoven processes, unlike staple fiber web forming processes, do not have separate filament cutting, i.e., staple fiber forming, and web-forming steps, thereby making the processes more economical than staple fiber web forming processes. Furthermore, the continuous filaments of spunbond nonwoven webs tend to provide higher strength nonwoven webs than staple fiber webs and do not produce lint, i.e., loose fibers, that may interfere with the performance of the filter media. In accordance with the present invention, two component conjugate fibers, bicomponent fibers, are particularly useful for the invention, and suitable bicomponent fibers have from about 20% to about 80%, preferably from about 40% to about 60%, by weight of a low melting polymer and from about 80% to about 20%, preferably about 60% to about 40%, by weight of a high melting polymer.

The component polymers of suitable conjugate fibers desirably are selected to have a melting point difference between the highest melting component polymer and the lowest melting component polymer of at least about 5° C., more desirably at least about 10° C., most desirably at least about 30° C., such that the lowest melting polymer can be melted without melting the higher melting component polymers of the fibers. The difference in the melting points can be used advantageously to bond nonwoven webs containing the conjugate fibers. When a nonwoven web containing the conjugate fibers is heated to a temperature equal to or higher than the melting point of the lowest melting component polymer but below the melting point of the highest melting component polymer, the melted portions of the fibers form interfiber bonds, especially at the cross-over contact points, throughout the web while the high melting polymer portions of the fibers maintain the physical and dimensional integrity of the web.

Desirably, the component polymers are selected additionally to have different crystallization and/or solidification properties to impart heat activatable latent crimpability in the fibers. When one or more of the component polymers of conjugate fibers having different crystallization properties, and thus different shrinkage properties, are solidified before they are fully crystallized or solidified while containing residual stress, the resulting fibers possess a potential or latent crimpability that can be heat activated. The shrinkage disparity among the component polymers of the conjugate fibers, which results from further crystallization and densification or from relaxation of residual stress, causes the fibers to crimp when the fibers are heated to allow further crystallization or relaxation of the component polymers. Exemplary processes for producing highly suitable conjugate fibers having such latent crimpability and nonwoven webs therefrom are disclosed in commonly assigned U.S. patent application Ser. No. 08/933,444, filed Aug. 21, 1993, now U.S. Pat. No. 5,382,400, which in its entirety is herein incorporated by reference. Alternatively, crimps in fibers can be imparted during the fiber spinning proceeds by asymmetrically cooling the fibers across the cross-section while the spun fibers are being drawn and solidified, even if the fibers are monocomponent fibers or the fibers are conjugate fibers that are not highly amenable to the above-described spontaneous crimping process. Such asymmetric cooling process generates a solidification gradient within the cross-section, causing crimps in the fibers. Yet another group of alternative processes for crimping conjugate and monocomponent fibers are mechanical crimping processes. As is known in the art, mechanical crimping devices, including gear crimpers and stuffer boxes, can be used to impart crimps in fibers. Suitable fibers for the present filter media have at least about 2 crimps per extended inch, desirably between about 2 and about 50 crimps per extended inch, more desirably between about 3 and about 30 crimps per extended inch, as measured in accordance with ASTM D-3937-82.

Crimps in suitable fibers can be imparted during or after the fiber spinning step, or after the fibers are laid to form a nonwoven web. However, it is highly desirable to crimp the fibers before they are laid or deposited to form a nonwoven web to ensure dimensional stability and uniformity of the web. This is because fibers inevitably change their dimensions when crimps are imparted in them, and it is highly impractical to control the movement of crimping fibers to protect against dimensional changes and non-uniformity of the recruiting crimped nonwoven web.

Nonwoven webs suitable for the present filter media are produced by isotropically depositing suitable fibers onto a forming surface to form a low-density, uniform nonwoven web with any known nonwoven web forming process, e.g., staple fibers are carded, air-laid or wet-laid and spunbond filaments are directly deposited, and then the unbonded nonwoven web is subjected to a bonding process. Suitable bonding processes for the present invention effect interfiber bonds without significantly compacting the nonwoven web in order to preserve the low-density, even-caliper structure of the unbonded nonwoven. However, a modified compaction bonding process, such as a point or calender bonding process that utilizes elongated bonding pins to minimize compaction of the regions that do not make direct contact with the bonding pins, can be supplementally applied to further improve the physical strength of a nonwoven filter medium without significantly affecting its overall loft.

As a particularly desirable embodiment of the invention, unbonded conjugate fiber nonwoven webs containing component polymers of different melting points, as discussed above, can be bonded by heating the web to a temperature sufficiently high enough to melt the lowest melting component polymer but below the melting point of the higher melting structural component polymers of the fiber web. For example, a through-air bonding, oven bonding, or infrared bonding process that effects interfiber bonds without applying significant compacting pressures can advantageously be used. Particularly suitable of these are through-air bonding processes which effect interfiber bonds by thoroughly and evenly heating the nonwoven web with a transverse flow of forced, heated air.

Alternatively, nonwoven webs can be bonded adhesively by applying an external liquid or powder adhesive or admixing adhesive fibers in the nonwoven webs. With the use of an external adhesive, even monocomponent fibers webs and conjugate fiber webs containing polymer components of similar melting points can be bonded without applying compacting pressure. However, adhesive bonding processes can be disadvantageous in that they introduce additional manufacturing steps and components into the nonwoven web forming process. Illustrative adhesives suitable for the present invention are hot-melt adhesives, including polyester-type and polyethylene-type hot-melt adhesives.

Monocomponent and conjugate fibers suitable for the present invention can be produced from a wide variety of thermoplastic polymers that are known to form fibers and desirably have a resistivity greater than about $10^{13}$ ohms-cm, more desirably greater than about $10^{14}$ ohms-cm, as measured in accordance with ASTM 257-61. Desirably, when conjugate fibers are utilized, the component polymers are selected in accordance with the above-described selection criteria. Suitable polymers for the present invention include, but are not limited to, polyolefins, e.g., polyethylene, polypropylene, polybutylene and the like; polyamides, e.g., nylon 6, nylon 6/6, nylon 10, nylon 12 and the like; polyesters, e.g., polyethylene terephthalate, polybutylene terephthalate and the like; polycarbonates; polystyrenes; thermoplastic elastomers, e.g., ethylenepropylene rubbers, styrenic block copolymers, copolyester elastomers and polyamide elastomers and the like; fluoropolymers, e.g., polytetrafluoroethylene and polytrifluorochloroethylene; vinyl polymers, e.g., polyvinyl chloride; polyurethanes; and blends and copolymers thereof. Particularly suitable polymers for the present invention are polyolefins, including polyethylene, e.g., linear low density polyethylene, low density polyethylene, medium density polyethylene, high density polyethylene and blends thereof; polypropylene; polybutylene; and copolymers as well as blends thereof. Of the suitable polymers, particularly suitable polymers for the high melting component of conjugate fibers include polypropylene, copolymers of polypropylene and ethylene and blends thereof, more particularly polypropylene, and particularly suitable polymers for the low melting component include polyethylenes, more particularly linear low density polyethylene, high density polyethylene and blends thereof; and most particularly suitable component polymers for conjugate fibers are polyethylene and polypropylene. Suitable fiber forming polymers may additionally have thermoplastic elastomers blended therein. In addition, the polymer components may contain additives for enhancing the crimpability and/or lowering the bonding temperature of the fibers, and enhancing the abrasion resistance, strength and softness of the resulting webs. For example, the low melting polymer component may contain about 5 to about 20% by weight of a thermoplastic elastomer such as an ABA' block copolymer of styrene, ethylenebutylene and styrene. Such copolymers are commercially available and some of which are identified in U.S. Pat. No. 4,663,220 to Wisneski et al. An example of highly suitable elastomeric block copolymers is KRATON G-2740. Another group of suitable additive polymers is ethylene alkyl acrylate copolymers, such as ethylene butyl acrylate, ethylene methyl acrylate and ethylene ethyl acrylate, and the suitable amount to produce the desired properties is from about 2 wt % to about 50 wt %, based on the total weight of the low melting polymer component. Yet other suitable additive polymers include polybutylene copolymers and ethylene-propylene copolymers.

Figure 1:
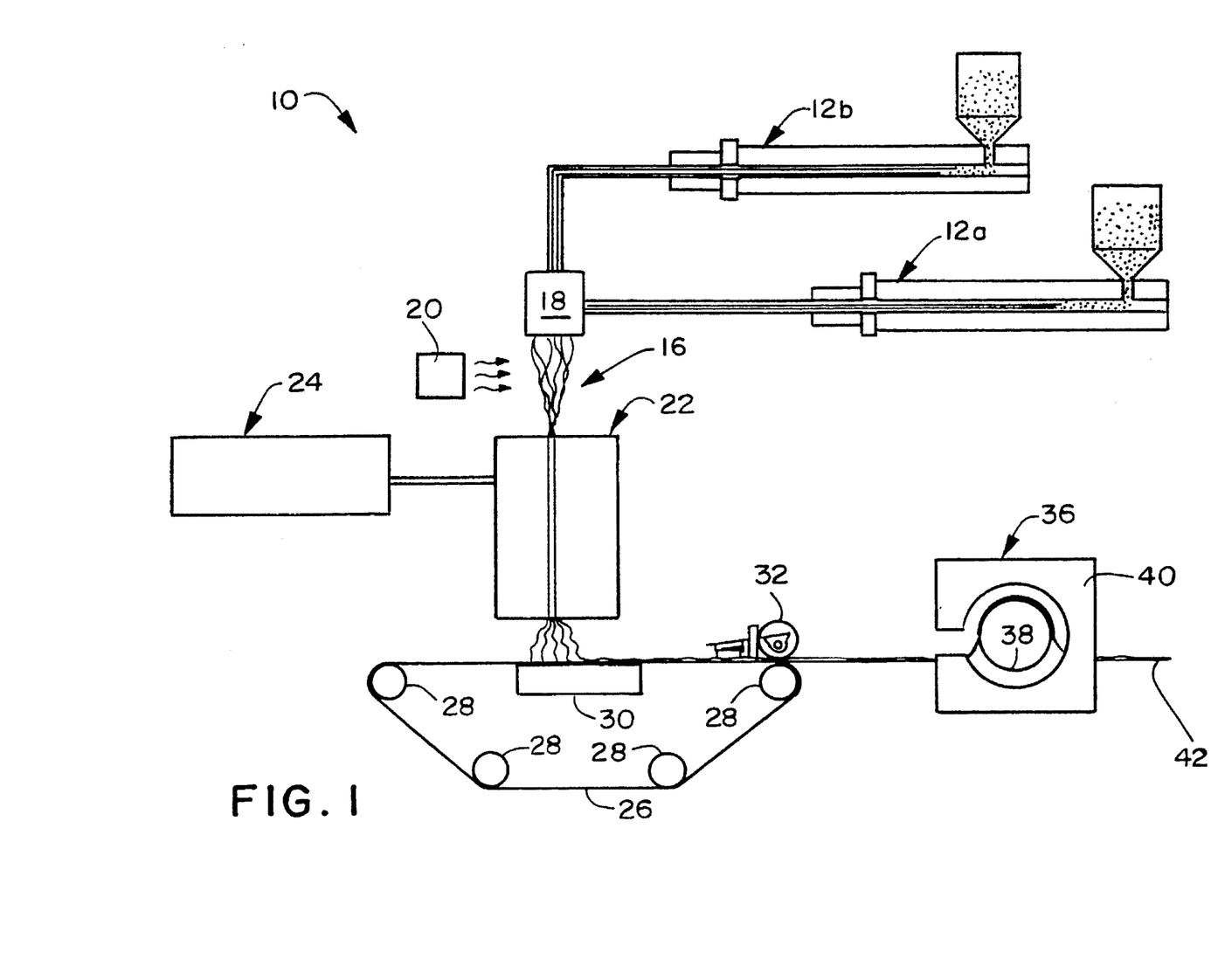
FIG. 1 is a schematic diagram of a bicomponent spunbond web forming process which can be used to produce a nonwoven web suitable for the present filter media.

Turning to FIG. 1, there is illustrated a particularly suitable process 10 for producing a highly suitable spunbond fiber web for the present filter media. The process line 10 includes a pair of extruders 12a and 12b for separately supplying extruded polymer components, a high melting polymer and a low melting polymer, to a bicomponent spinneret 18. The spinneret 18 has openings arranged in one or more rows, and the openings form a downwardly extending curtain of fibers when the polymers are extruded through the spinneret.

The line 10 further includes a quenching gas outlet 20 adjacently positioned to the curtain of fibers 16 extending from the spinneret 18, and the gas from the outlet 20 at least partially quenches, i.e., the polymer forming the fibers is no longer able to freely flow, and develops a latent helical crimp in the extending fibers 16. As an example, an air stream of a temperature between about 45° F. and about 90° F. which is directed substantially perpendicular to the length of the fibers at a velocity from about 100 to about 400 feet minute can be effectively used as a quenching gas. Although the quenching process is illustrated with a one-outlet quenching system, more than one quenching gas outlets can be utilized.

A fiber draw unit or an aspirator 22 is positioned below the quenching gas outlet and receives the quenched fibers.

Fiber draw units or aspirators for use in melt spinning polymers are known in the art, and exemplary fiber draw units suitable for the present invention include a linear fiber aspirator of the type shown in U.S. Pat. No. 3,802,817 to Matsuki et al. and eductive guns of the type shown in U.S. Pat. Nos. 3,692,618 to Dorshner et al. and 3,423,266 to Davies et al. The fiber draw unit 22, in general, has an elongated passage through which the fibers are drawn by aspirating gas. The aspirating gas may be any gas, such as air, that does not adversely interact with the polymers of the fibers. In accordance with the present invention, the aspirating gas is heated using, for example, a temperature adjustable heater 24. The heated aspirating gas draws the quenched fibers and heats the fibers to a temperature that is required to activate the latent crimps thereon. The temperature required to activate the latent crimp on the fibers ranges from about 110° F. to a maximum of less than the melting point of the low melting component polymer. Generally, a higher air temperature produces a higher number of crimps. One of the important advantages of the present fiber web forming process is that the crimp density, i.e., the number of crimps per unit length of a fiber, of the fibers and thus the density and pore size distribution of the resulting webs can be controlled by controlling the temperature of the aspirating gas, providing a convenient way to engineer nonwoven webs to accommodate different needs of different filter applications. The crimp density can also be controlled to some degree by regulating the amount of potential latent crimps that can be heat activated, and the amount of potential latent crimps can be controlled by varying the spinning conditions, e.g., melt temperature and aspirating gas velocity. For example, higher amounts of potential latent crimps can be imparted on bicomponent conjugate fibers of polyethylene/polypropylene by supplying lower velocities of aspirating gas.

The drawn crimped fibers are then deposited in a random manner onto a continuous forming surface 26, which is driven by drive rollers 28. The fiber depositing process desirably is assisted by a vacuum device 30 placed underneath the forming surface. The vacuum force largely eliminates the undesirable scattering of the fibers and guides the fibers onto the forming surface to form a uniform unbonded web of continuous fibers. The resulting web can be lightly compressed by a compression roller 32, if a light compaction of the web is desired to provide enhanced integrity to the unbonded web before the web is subjected to a bonding process.

The unbonded web is then bonded in a bonder, such as a through-air bonder 36, to provide coherency and physical strength. In the through-air bonder 36, a flow of heated air is applied through the web, e.g., from a hood 40 to a perforated roller 38, to heat the web to a temperature above the melting point of the low melting component polymer but below the melting point of the high melting component polymer. The bonding process may be assisted by a vacuum device that is placed underneath the perforated roller 38. Upon heating, the low melting polymer portions of the web fibers are melted and the melted portions of the fibers adhere to adjacent fibers at the cross-over contact points while the high melting polymer portions of the fibers tend to maintain the physical and dimensional integrity of the web. As such, the through-air bonding process turns the unbonded web into a cohesive nonwoven fiber web 42 without significantly changing its originally engineered web dimensions, density, porosity and crimp density.

The bonding air temperature may vary widely to accommodate different melting points of different component polymers and to accommodate the temperature and speed limitations of different bonders. In addition, basis weight of the web must be considered in choosing the air temperature. It is to be noted that the duration of the bonding process should not be too long as to induce significant shrinkage of the web. As an example, when polypropylene and polyethylene are used as the component polymers for a conjugate-fiber web, the air flowing through the through-air bonder may have a temperature between about 230° F. and about 280° F. at a velocity from about 100 to about 500 feet per minute, and the dwell time of the web in the bonder is desirably less than about 6 seconds.

In addition, the through-air bonding process can be utilized to impart a pore size gradient in the direction of thickness of the nonwoven web. A decreasing pore size gradient in a filter medium in the direction of fluid flow improves its filter efficiency and service life by systemically entrapping particulates according to their size. Alternatively stated, the upper layer of such a filter medium acts as a prefilter that systemically entraps larger particles and preserves small pores for small particles. The heated air flow rate and the vacuum flow rate can be adjusted to apply a gradually increasing, lightly compacting pressure on the nonwoven web while the web is being bonded, thereby forming an increasing fiber density gradient and a decreasing pore size gradient in the direction of thickness of the web.

In accordance with the present invention, the nonwoven filter media are electretized to further improve the filter efficiency. Electret treating processes suitable for the present invention are known in the art. These methods include thermal, plasma-contact, electron beam and corona discharge methods, and electretizing processes can be applied during the fiber spinning stage of the nonwoven web forming process or after the nonwoven web is fully formed. For example, U.S. Pat. No. 4,215,682 to Kubik et al. discloses an electretizing process for meltblown fibers that imparts a permanent electrostatic charge during the fiber spinning process, and U.S. Pat. No. 4,375,718 to Wadsworth et al. and U.S. patent application Ser. No. 07/958,958 filed Oct. 9, 1992, now U.S. Pat. No. 5,401,446, which is assigned to the University of Tennessee, disclose electretizing processes for fully formed nonwoven webs.

Figure 2:
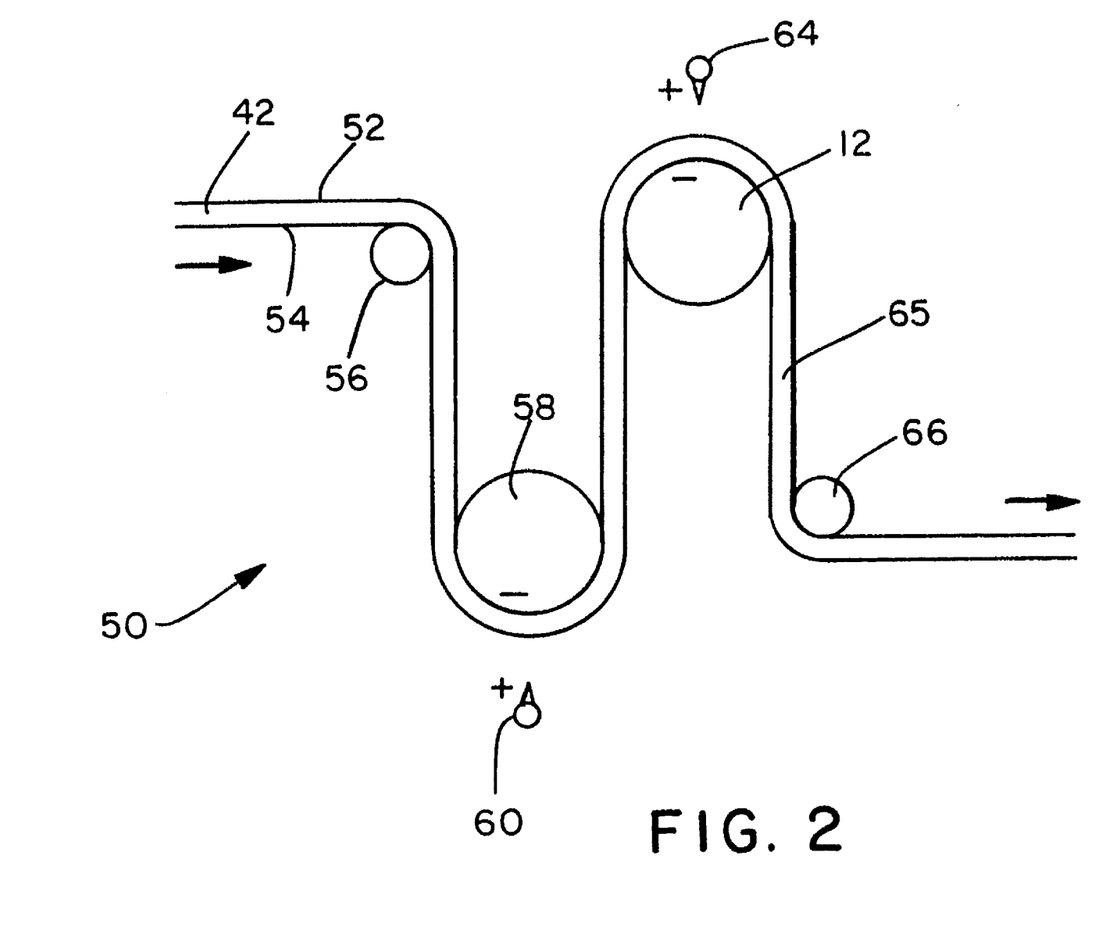
FIG. 2 is a schematic diagram of an electretizing process suitable for the present invention.

A suitable nonwoven web can be conveniently charged or electretized by sequentially subjecting the web to a series of electric fields such that adjacent electric fields have substantially opposite polarities with respect to each other. For example, one side of the web is initially subjected to a positive charge while the other side is subjected to a negative charge, and then the first side of the web is subjected to a negative charge and the other side of the web is subjected to a positive charge, imparting permanent electrostatic charges in the web. A suitable apparatus for electretizing the nonwoven web is illustrated in FIG. 2. An electretizing apparatus 50 receives a nonwoven web 42 having a first side 52 and a second side 54. The web 42 passes into the apparatus 50 with the second side 54 in contact with guiding roller 56. Then the first side 52 of the web comes in contact with a first charging drum 58 which rotates with the web 42 and brings the web 42 into a position between the first charging drum 58 having a negative electrical potential and a first charging electrode 60 having a positive electrical potential. As the web 42 passes between the charging electrode 60 and the charging drum 58, electrostatic charges are developed in the web 42. A relative positive charge is developed in the first side and a relative negative charge is developed in the second side. The web 42 is then passed between a negatively charged second drum 62 and a positively charged second electrode 64, reversing the polarities of the electrostatic charge previously imparted in the web and permanently imparting the newly developed electrostatic charge in the web. The electretized web 65 is then passed on to another guiding roller 66 and removed from the electretizing apparatus 50. It is to be noted that for discussion purposes, the charging drums are illustrated to have negative electrical potentials and the charging electrodes are illustrated to have positive electrical potentials. However, the polarities of the drums and the electrodes can be reversed and the negative potential can be replaced with ground. In accordance with the present invention, the charging potentials useful for electretizing processes may vary with the field geometry of electretizing processes. For example, the electric fields for the above-described electretizing process can be effectively operated between about 1 KVDC/cm and about 30 KVDC/cm, desirably between about 4 KVDC/cm and about 20 KVDC/cm, when the gap between the drum and the electrodes is about 0.9 inches. The above-described suitable electretizing process is further disclosed in above-mentioned U.S. Pat. No. 5,401,446, which is herein incorporated by reference.

As a desired embodiment of the present invention, the nonwoven web forming process and the electretizing process are conducted in a continuous in-line process, although the two processes can be conducted separately in sequence.

The filter efficiency of the filter media can be even further improved by utilizing shaped fibers that have a higher fiber surface area than conventional round fibers and/or a cross-sectional shape that allows the fibers to form a filter medium which has slender interfiber pore configurations. Such filter media having a higher fiber surface area and improved pore configurations provide higher filter efficiencies. Particularly useful cross-sectional shapes suitable for the present conjugate fibers include rectangular, oblong, triangular, trilobal and other multilobal shapes.

The present filter media provide a high filter efficiency that is comparable to that of microfiber filter media without the high pressure drop of microfiber filter media. In addition, the present crimped fiber filter media provide highly improved service life, filter capacity and self-supporting physical integrity and strength. In addition, the filter media, especially the media produced from conjugate fibers, are highly thermoformable. When the filter media are heated to a temperature within the above-described bonding range, in which only the lowest melting component polymer is melted, the media can be easily thermoformed without applying any significant compacting pressure and thus preserving the advantageous loft of the media. For example, the filter media can be thermoformed to a pleat to enhance physical strength and to increase the effective filtration area. A thermoforming processes suitable for the nonwoven web for the filter media is disclosed in commonly assigned U.S. patent application Ser. No. 08/176,594 filed Jan. 3, 1994, which is herein incorporated by reference. Briefly and nonexhaustively described, the thermoforming process contains the steps of heating a fully formed conjugate fiber web to melt the lowest component polymer of the web, e.g., using a through-air heating process; applying a minimal pneumatic or mechanical shaping pressure on the heated web to make the web conform to the contour of a mold; cooling the web to a temperature below the melting temperature of the lowest melting polymer while maintaining the shaping pressure.

The nonwoven web for the present filter media may contain additives and other fibers known to enhance the performance of filter media. For example, the nonwoven web may contain within its fiber matrix particulates of odor and/or chemical absorbent particles, e.g., activated carbon; filler and bulking fibers; germicides; disinfectants and the like. In addition, the fibers forming the filter media may contain conventional additives, such as, heat-stabilizers, fillers, UV-stabilizers, pigments and the like.

Although the present crimped fiber filter media are described as single-layer media, crimped fiber layers having different crimp densities can be sequentially deposited and then bonded to form a filter medium which contains sublayers of different interfiber pore structures. For example, crimped fiber layers of decreasing crimp densities can be sequentially deposited to produce a filter medium having an increasing interfiber pore-size gradient structure. Alternatively, the crimped fiber filter media of different interfiber pore structures can be laminated to form a composite filter medium. When a filter medium having more than one layer is produced, it is highly desirable to add a pigment or colorant to the polymer composition of one of the outer layers, i.e., the bottom or top layer, so that the direction of the gradient or pore structure arrangement of the multi-layer filter medium can be readily designated and visually ascertained.

The present invention is further described with the following examples, which are provided for illustration purposes and the invention is not limited thereto.

EXAMPLES

The following test procedures were utilized to determine various properties of the filter media.

Sodium Chloride Filter Efficiency Test: This test method determines filter retention of NaCl particles in an apparatus that sends a flow of NaCl aerosol particles suspended in air at a rate of 5 ft/min. into a 0.5 $ft^2$ filter medium. The NaCl particles were generated into an aerosol from a 1% NaCl solution by a Laskin nozzle type atomizer and were in the range between approximately 0.1 μm and 3 μm. The efficiency of the filter medium was determined by measuring the particle size distribution and number of particles at positions upstream and downstream of the test filter medium. The efficiency was defined as 100*(1-(downstream particle counts/upstream particle counts)). The particle sizes and counts were measured using an automatic particle counter and sensor, HIAC/ROYCO Model 5109/1230, which are available from Pacific Scientific Co., Silver Spring, Md.

Modified ASHRAE Test: This test measures the efficiency of a filter medium with a standardized Arizona Dust Contaminant. The test procedure was similar to the NaCl test, except test dust particles were injected into the air stream and a HIAC/ROYCO Model 8000 automatic particle counter was used. The Arizona Dust Contaminant used was a coarse grade, which is available from Powder Technology, Inc., Burnsville, Minn., and had the following particle size distribution:

| Particle Size (≦ μm) | Volume % |
|---|---|
| 5 | 12 |
| 10 | 24 |
| 20 | 38 |
| 40 | 61 |
| 80 | 91 |
| 200 | 100 |

The Modified ASHRAE test was conducted at a higher air flow rate than the NaCl test, and the air flow rate used was 150 ft/min or 60 ft/min.

Capacity Test: This test determines the particle retention capacity of a filter medium over a range of pressure drops across the medium. The testing procedure was the same as the Modified ASHRAE test, except the pressure drop across the filter medium and the weight of the test dust injected were monitored, and the test particles were continuously injected until a specified terminal pressure was achieved. The capacity was obtained by the difference between the amount of particles injected in the upstream of the filter medium and the amount of particles collected in the downstream. The pressure drop across the medium was measured in inches of water ($H_2O$).

Frazier Permeability: The Frazier permeability, which expresses the permeability of a fabric in terms of cubic feet per minute of air per square foot of medium at a pressure drop of 0.5 inch of water, was determined utilizing a Frazier Air Permeability Tester available from the Frazier Precision Instrument Company and measured in accordance with Federal Test Method 5450, Standard No. 191A.

Density: The density of each filter medium was calculated from the caliper and basis weight of each test specimen, which was measured at 0.5 psi with a Starret-type bulk tester.

Surface Charge Potential: The charge potential was measured with a Monroe model 244 Isoprobe Electrostatic Voltmeter with a 1017E Probe having a 0.07 inch opening. The probe was connected to a Velmex system which allows webs with dimensions up to 20×38 inches to be scanned with the probe.

Examples 1–6 (Ex 1–Ex 6)

A low density filter medium was produced with a process illustrated in FIG. 1. Linear low density polyethylene, Aspun 6811A, which is available from Dow Chemical, was blended with 2 wt % of a $TiO_2$ concentrate containing 50 wt % of $TiO_2$ and 50 wt % of a polypropylene, and the mixture was fed into a first single screw extruder. Polypropylene, PD3443, which is available from Exxon, was blended with 2 wt % of the above-described $TiO_2$ concentrate, and the mixture was fed into a second single screw extruder. The extruded polymers were spun into round bicomponent fibers having a side-by-side configuration and a 1:1 weight ratio of the two polymers using a bicomponent spinning die, which had a 0.6 mm spinhole diameter and a 6:1 L/D ratio. The temperatures of the molten polymers fed into the spinning die were kept at 450° F., and the spinhole throughput rate was 0.5 gram/hole/minute. The bicomponent fibers exiting the spinning die were quenched by a flow of air having a flow rate of 45 SCFM/inch spinneret width and a temperature of 65° F. The aspirator was equipped with a temperature controlled aspirating air source, and the feed air temperature was kept at about 350° F. The fibers for each test specimen entering the aspirator were drawn with the heated feed air at a flow rate as indicated in Table 1. The weight-per-unit-length measurement of the drawn fibers was about 2.5 denier per filament. The drawn fibers were then deposited on a foraminous forming surface with the assist of a vacuum flow to form an unbonded fiber web. The unbonded fiber web was bonded by passing the web on a foraminous supporting surface through a through-air bonder that applied a flow of heated air at a temperature of 272° F. and a velocity of 200 feet/min. The residence time for each web specimen in the bonder was about 2–4 seconds. The resulting nonwoven webs were uniformly bonded and had an increasing fiber density gradient toward the surface that was placed adjacent to the foraminous supporting surface.

TABLE 1

| Example | Heated Air Flow Rate ($ft^3$/minute/inch width) |
| --- | --- |
| Ex 1 | 19 |
| Ex 2 | 19 |
| Ex 3 | 19 |
| Ex 4 | 20.5 |
| Ex 5 | 19 |
| Ex 6 | 19 |

The bonded nonwoven webs were charged by passing the web at a speed of 100 ft/min through an electretizing apparatus that contained three sections. The first section of the electretizing apparatus had a bar electrode, which was placed above the web and had a positive potential of about 16 KV, and a roller, which was placed below the web and was grounded; the second section had a charging roller, which was placed above the web and had a negative potential of about 7.5 KV, and a bar electrode, which was placed below the web and had a positive potential of about 25 KV; and the third section had an idler roller which was grounded. The gap between the charging electrode and the roller was kept at about 0.875 inch.

Control 1 (C1)

A commercial glass fiber HVAC filter, which is available from Precisionair, was tested for its filtration properties.

Control 2 (C2)

A commercial HVAC filter, The Web, which is available from Web Products, Kansas City, Miss., was tested for its filtration properties. The filter medium is believed to be a self-charging electrostatic laminate of a nonwoven web and an open-cell polyurethane foam.

Control 3 (C3)

A 0.75 osy meltblown microfiber web was formed from polypropylene, PC973 manufactured by Himont, in accordance with the process described in U.S. Pat. No. 3,978,185 to Buntin et al. The fibers of the meltblown web had diameters in the range from about 3 μm to about 8 μm. The meltblown web was electretized in accordance with the electretizing process described in Example 1.

Controls 4–5 (C4–C5)

A 3 osy point bonded spunbond nonwoven web and a 6 osy point bonded spunbond nonwoven web were produced and electretized. Unbonded nonwoven webs were produced using polypropylene, PD3443, in accordance with the fiber spinning procedure outlined in Example 1, except only one extruder was operated, a monocomponent fiber spinning die was utilized and the aspirating unit was operated with unheated ambient air. The drawn fibers had a weight-per-unit-length measurement of about 3 denier per filament. The unbonded nonwoven web was fed into the nip formed by a calender roll and an anvil roll. The calender roll was a steel roll having a patterned configuration of raised points on its surface and a diameter of about 24 inches. The calender roll was equipped with a heating means and regularly spaced, raised bonding pins on its surface. The bonding pattern contained a pin density of about 34 pins per $cm^2$ and each of the pins had a bonding area of about 0.0074 $cm^2$. The anvil roll was a smooth stainless steel 24 inch diameter roll with a heating means. Both of the rolls were heated at about 305° F. and the pressure applied on the webs was 500 lbs/linear inch of width. The bonded nonwoven webs were electretized in accordance with Example 1.

Control 6 (C6)

A 3 osy spunbond nonwoven web produced in accordance with Example 3 was produced but was not electretized.

Control 7 (C7)

A 0.6 osy meltblown microfiber web was produced and electretized in accordance with the process outlined in Control 3.

I. Modified Ashrae Filter Efficiency

The specimens of Example 1–6 and Control 1–6 were tested for their filter efficiency using the Arizona Dust Contaminant. The results are shown in Table 2.

TABLE 2

| Example | Basis Weight (osy) | Denier (dpf) | Density (g/cm³) | Frazier Permeability (cfm/sf) | Test Air Flow Rate (ft/min) | Efficiency (%) Particle size (μm) | | |
|---|---|---|---|---|---|---|---|---|
| | | | | | | 1–2 | 2–5 | >25 |
| Ex 1 | 0.6 | 2.5 | 0.047 | 1,060 | 60 | 30.1 | 53.3 | 90.9 |
| Ex 2 | 1 | 2.5 | 0.03 | 700 | 60 | 56.2 | 75.0 | 95.2 |
| Ex 3 | 3 | 2.5 | 0.024 | 360 | 60 | 77.6 | 89.8 | 99.9 |
| Ex 4 | 6 | 2.4 | 0.04 | 144 | 150 | 93.6 | 98.2 | 99.8 |
| Ex 5 | 6 | 2.5 | 0.026 | 240 | 150 | 90.0 | 94.8 | 99.8 |
| Ex 6 | 3 | 2.5 | 0.025 | 360 | 150 | 77.4 | 89.8 | 94.0 |
| C1 | 3 | 4.0 | 0.025 | 1,530 | 150 | 19.2 | 31.3 | 42.4 |
| C2 | 8 | 4.0 | 0.019 | 670 | 150 | 39.2 | 62.4 | 67.9 |
| C3 | 0.75 | 0.06 | 0.10 | 74 | 150 | 90.2 | 94.7 | 99.8 |
| C4 | 3 | 2.5 | 0.17 | 47 | 150 | 89.1 | 93.7 | 99.8 |
| C5 | 6 | 2.5 | 0.16 | 48 | 150 | 87.6 | 94.0 | 99.8 |
| C6 | 3 | 2.5 | 0.024 | 365 | 60 | 59.0 | 72.5 | 69.3 |

The results of Examples 1 and 2 compared to Controls 1 and 2 demonstrate that the present nonwoven filter media provide a significantly higher filter efficiency without sacrificing the Frazier permeability, showing that the present nonwoven filter media provide a significantly improved filter efficiency than prior art filter media having similar Frazier permeabilities. Although Examples 1–2 and Controls 1–2 were tested at different air flow rates, the similar efficiency results of Examples 3 and 6, which were virtually the same filter media, indicate that there is no significant difference in the filtration performance within the range of these air flow rates and that the results of Examples 1–2 and Controls 1–2 can be compared to arrive at the above-indicated conclusion.

Control 3 which is an example of microfiber filter webs clearly shows that the high efficiency of the microfiber filter medium is accompanied by a low permeability, indicating that a large driving pressure is needed to properly operate the filter medium. Compared to the microfiber filter medium of Control 3, the lofty filter medium of Example 5 provides the same filter efficiency at a Frazier permeability that is about 320% higher, demonstrating that the present filter media provide a high filter efficiency without the high pressure drop of microfiber filter media. In addition, the filter media of Controls 4 and 5, which are fabricated with filaments having a fiber size similar to the filaments of the present lofty filter media, when compared to the present filter media provide similar efficiencies at significantly lower Frazier permeabilities. Surprisingly, the low-density structure of the present filter media does not diminish the filter efficiency while providing a highly improved Frazier permeability. As such, the present filter media are high efficiency, high throughput filter media.

II. Sodium Chloride Filter Efficiency

The nonwoven filter media of Example 3 and Controls 3 and 7 were tested for their microparticle filter efficiency using the NaCl test. The results are shown in Table 3.

TABLE 3

| Example | Basis Weight (osy) | Denier (dpf) | Frazier Permeability (cfm/sf) | Efficiency (%) Particle size (μm) | | |
|---|---|---|---|---|---|---|
| | | | | 0.09–0.1 | 0.1–0.2 | 0.5–1.0 |
| Ex 3 | 3 | 2.5 | 360 | 88.8 | 88.6 | 90.3 |
| C 3 | 0.75 | 0.06 | 74 | 92.0 | — | — |

TABLE 3-continued

| Example | Basis Weight (osy) | Denier (dpf) | Frazier Permeability (cfm/sf) | Efficiency (%) Particle size (μm) | | |
|---|---|---|---|---|---|---|
| | | | | 0.09–0.1 | 0.1–0.2 | 0.5–1.0 |
| C 7 | 0.6 | 0.06 | 110 | 89.0 | — | — |

The efficiency results of Example 3 and Controls 3 and 7 demonstrate that the filter efficiency of the present nonwoven filter media is essentially the same as the filter efficiency of prior art microfiber filter media, but the media of the invention have a significantly higher permeability.

III. Filter Capacity Test

The test specimens for Examples 3–5 and Controls 3–5 were tested for their filter capacity. The capacity test was run to a pressure drop across the media of 0.5 inches H$_2$O, 5 inches H$_2$O, or until a significant amount of the dust particles was deposited in the filter medium. The results are shown in Table 4. The number for the Unit Basis Weight Gain indicates the weight gained by each filter medium per unit change in pressure drop in inch H$_2$O assuming a linear relationship between the pressure drop and the gained weight.

TABLE 4

| Example | Basis Weight (osy) | Pressure Drop (inches H$_2$O) | | Weight Gain | |
|---|---|---|---|---|---|
| | | Initial | Stopped | Actual (gm) | Unit basis (gm/in H$_2$O) |
| Ex 3 | 3 | 0.17 | 0.50 | 10.4 | 31.5 |
| Ex 4 | 6 | 0.46 | 0.53 | 1.8 | 25.7 |
| Ex 5 | 6 | 0.46 | 0.51 | 6.4 | 128.0 |
| Ex 5 | 6 | 0.46 | 3.10 | 68.5 | 25.9 |

TABLE 4-continued

| Example | Basis Weight (osy) | Pressure Drop (inches H₂O) | | Weight Gain | |
|---|---|---|---|---|---|
| | | Initial | Stopped | Actual (gm) | Unit basis (gm/in H₂O) |
| C3 | 0.75 | 0.8 | 5.1 | 5.6 | 1.3 |
| C4 | 3 | 1.23 | 5.0 | 1.9 | 0.5 |
| C5 | 6 | 1.62 | 5.0 | 1.7 | 0.5 |

The filter capacity test results indicate that the present filter media exhibit an excellent filter capacity. The capacity of the present filter media is markedly higher at a given pressure drop and for a given increase in pressure drop than prior art filter media, indicating a long service-life. In fact, the magnitude of the filter capacity improvement of the present filter media was highly unexpected. In addition, the results of Example 5 and Control 3 demonstrate that the present filter media can provide a filtration capacity at a much lower pressure drop than microfiber filter media. Consequently, the present filter media are highly suitable for filter applications where a high filter capacity without a high pressure drop is required.

IV. Shaped Fiber Filter Media

Example 7 (Ex 7)

A 3 osy nonwoven web was produced and electretized in accordance with the procedure outlined in Example 1.

Example 8 (Ex 8)

A 3 osy nonwoven web with trilobal shaped side-by-side bicomponent fibers was produced in accordance with the process outlined in Example 1, except the fiber spinning die had trilobal die openings.

Control 8 (C8)

Control 8 is an unelectretized nonwoven web produced in Example 7.

The nonwoven webs of Examples 7–8 and Control 8 were tested for their Frazier permeabilities and efficiencies. The results are shown in Table 5.

TABLE 5

| Example | Fiber Shape | Basis Weight (osy) | Denier (dpf) | Density (g/cm³) | Frazier Permeab. (cmf/sf) | Efficiency (%) Particle size (μm) | | | |
|---|---|---|---|---|---|---|---|---|---|
| | | | | | | 2–3 | 4–5 | 5–6 | >10 |
| Ex 7 | Round | 3 | 2.5 | 0.054 | 330 | 82.8 | 91.3 | 92.3 | 97.4 |
| Ex 8 | Trilobal | 3 | 3.5 | 0.054 | 315 | 94.0 | 97.1 | 97.0 | 97.7 |
| C 8 | Round | 3 | 2.5 | 0.054 | 330 | 42.1 | 62.6 | 65.9 | 88.2 |

The results demonstrate that the increased fiber surface of shaped fibers clearly improves the filter efficiency of the filter media, especially for small contaminant particles.

V. Durability of Electret Charges

The durability of the imparted electret charge in the present filter media was tested as follows.

Examples 9–10 (Ex 9-Ex 10)

A test specimen of the nonwoven filter medium of Example 3 was tested for its NaCl filter efficiency for particles having an average size of about 0.1 μm soon after the medium was prepared (Example 9). The filter medium was stored for about 10 weeks in ambient environment and was tested again for its NaCl filter efficiency (Example 10). The NaCl filter efficiency was tested on an automated filter tester, Certitest™ Model #8110, which is available from TSI Inc., St. Paul, Minn. The automated filter tester conducts the above-described NaCl filter efficiency test. However, the tester does not actually count the number of particles but calculates the number by measuring the particle distribution profile. The results are shown in Table 6.

TABLE 6

| Example | NaCl Particle Filter Efficiency (%) |
|---|---|
| Ex 9 | 61 |
| Ex 10 | 59 |

The results show that the efficiency of the filter medium did not change significantly over 10 weeks, indicating that the electret charge imparted in the present filter medium was not measurably changed over time and thus the charge is highly durable.

It is to be noted that the NaCl particle efficiency measurement for the 3 osy filter medium indicated in Table 6 (Example 9) was lower than the efficiency measurement disclosed in Table 3 for the same filter medium (Example 3). However, this discrepancy is believed to have arisen from the use of different testing apparatus.

As can be seen from the examples, the nonwoven filter media of the present invention have a high efficiency that is comparable to the filter media of microfibers and provide a long service life. Moreover, the present nonwoven filter media provide a high filter efficiency without the high pressure drop of microfiber filter media. The nonwoven crimped fiber filter media are highly suitable for gaseous filter applications, such as, HVAC filters, automobile air filters, respirator filters, face-mask filters and the like.

What is claimed is:

1. A filter medium comprising an electretized nonwoven web of crimped fibers selected from the group consisting of spunbond filaments and staple fibers, wherein said nonwoven web has a Frazier permeability equal to or greater than about 100 ft³/min/ft² and a density between about 0.01 g/cm³ and about 0.095 g/cm³, and wherein said crimped fibers are crimped before they are formed into said nonwoven web and have a crimp level of at least 2 crimps per extended inch, as measured in accordance with ASTM D3937-82.

2. The filter medium of claim 1 wherein said fibers comprise a fiber-forming thermoplastic polymer with a resistivity greater than about 10¹³ ohms-cm, as measured in accordance with ASTM 257-61.

3. The filter medium of claim 1 wherein said fibers comprise a thermoplastic polymer selected from the group consisting of polyolefins, polyamides, polyesters, polycarbonates, polystyrenes, thermoplastic elastomers, fluoropolymers, vinyl polymers, polyurethane, and blends and copolymers thereof.

4. The filter medium of claim 1 wherein said fibers are conjugate fibers comprising two thermoplastic polymers.

5. The filter medium of claim 4 wherein said thermoplastic polymers have different melting points.

6. The filter medium of claim 5 wherein said thermoplastic polymers have different crystallization properties.

7. The filter medium of claim 4 wherein said thermoplastic polymers are selected from polyolefins.

8. The filter medium of claim 4 wherein said thermoplastic polymers are polypropylene and polyethylene.

9. The filter medium of claim 8 wherein said polyethylene is selected from the group consisting of linear low density polyethylene, high density polyethylene and blends thereof.

10. The filter medium of claim 1 wherein said nonwoven web has a increasing fiber density toward one of its planar surfaces.

11. The filter medium of claim 1 wherein said fibers are shaped fibers.

12. The filter medium of claim 1 further comprises one additional layer of said electretized nonwoven web, forming a top layer and a bottom layer, wherein said top and bottom layers have different Frazier permeabilities.

13. The filter medium of claim 12 wherein one of said top and bottom layers is pigmented.

14. A filter medium comprising an electretized nonwoven web of crimped conjugate fibers selected from the group consisting of spunbond filaments and staple fibers, wherein said nonwoven web has a Frazier permeability equal to or greater than about 100 $ft^3/min/ft^2$ and a density between about 0.01 $g/cm^3$ and about 0.095 $g/cm^3$, and wherein said crimped fibers are crimped before they are formed into said nonwoven web and have a crimp level of at least 2 crimps per extended inch, as measured in accordance with ASTM D3937-82.

15. The filter medium of claim 14 wherein said fibers comprise two thermoplastic polymers.

16. The filter medium of claim 15 wherein said thermoplastic polymers have different melting points and crystallization properties.

17. The filter medium of claim 15 wherein said thermoplastic polymers are selected from polyolefins.

18. The filter medium of claim 17 wherein said thermoplastic polymers are polypropylene and polyethylene.

19. The filter medium of claim 14 wherein said nonwoven web has a increasing fiber density toward one of its planar surfaces.

20. The filter medium of claim 14 wherein said fibers are shaped fibers.

21. A fluid filter medium comprising an electretized nonwoven web of crimped conjugate spunbond filaments, wherein said nonwoven web has a Frazier permeability equal to or greater than about 100 $ft^3/min/ft^2$ and a density between about 0.01 $g/cm^3$ and about 0.095 $g/cm^3$, and wherein said crimped filaments are crimped before they are formed into said nonwoven web and have a crimp level of at least 2 crimps per extended inch, as measured in accordance with ASTM D3937-82.

22. The fluid filter medium of claim 21 wherein said conjugate fibers comprise two thermoplastic polymers.

23. The filter medium of claim 22 wherein said thermoplastic polymers have different melting points and crystallization properties.

24. The filter medium of claim 22 wherein said thermoplastic polymers are polypropylene and polyethylene.

25. The filter medium of claim 21 wherein said nonwoven web has a increasing fiber density toward one of its planar surfaces.

26. The filter medium of claim 21 wherein said fibers are shaped fibers.

* * * * *